Patented Dec. 6, 1949

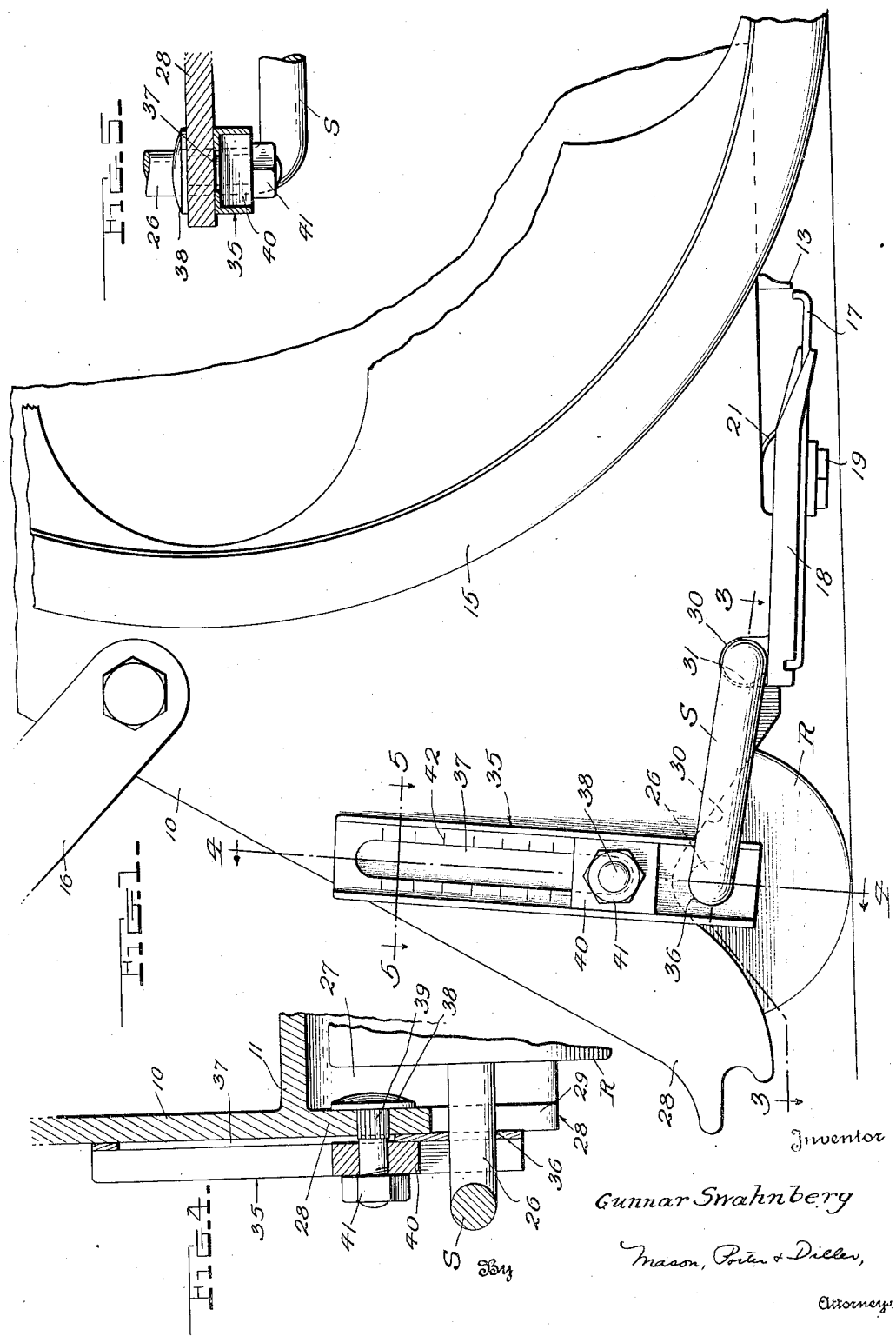

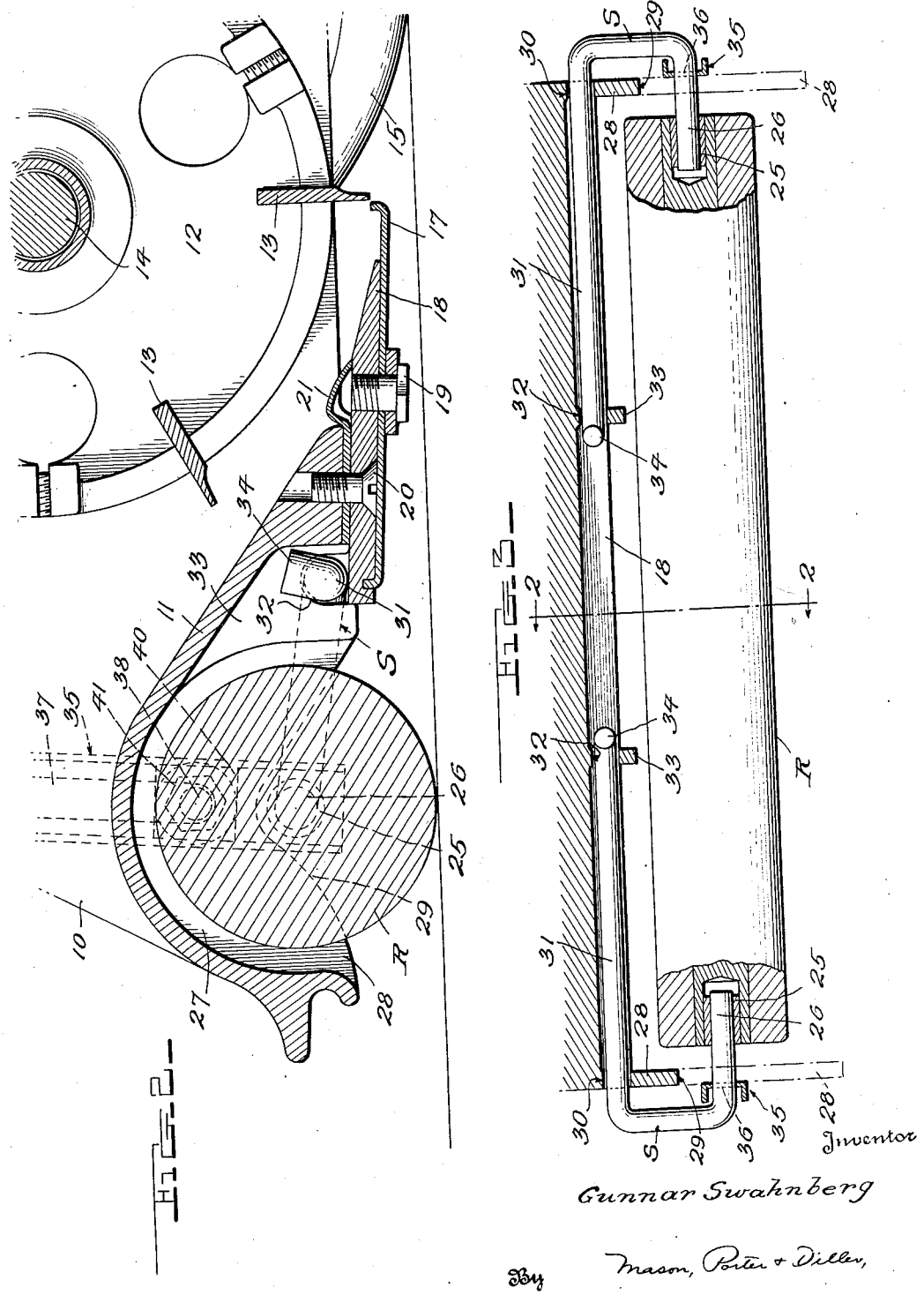

2,490,171

UNITED STATES PATENT OFFICE 2,490,171

ROLLER MOUNTING FOR LAWN MOWERS

Gunnar Swahnberg, Keene, N. H.

Application April 12, 1945, Serial No. 587,855

3 Claims. (Cl. 280—43)

This invention is concerned with a roller mounting for lawn mowers, with inclusion of means for adjusting the position of the roller.

One of the features of the invention is a roller mounting which includes journalling devices which can be easily separated for inspecting or replacing the roller without disturbing the roller adjustment.

Another feature is the provision of a mounting and adjustment means for the roller by which the efforts upon the roller are resisted by parts acting in intersecting planes for respectively assuming large proportions of the weight load and the movement load upon the roller.

A further feature is the provision of a roller mount of great strength and rigidity.

With these and other features as objects in view, as will apear from the following description and claims, an illustrative form of practice is shown on the accompanying drawings in which:

Figure 1 is a side elevation of a part of a lawn mower, with the roller mounting forming a part thereof.

Figure 2 is an upright sectional view, substantially on line 2—2 of Figure 3.

Figure 3 is a horizontal section, substantially on line 3—3 of Figure 1.

Figure 4 is on upright section of an adjustment assembly substantially on line 4—4 of Figure 1.

Figure 5 is a horizontal section of an adjustment assembly, substantially on line 5—5 of Figure 1.

In these drawings, the lawn mower is shown as having a body comprising the side plates 10 and the floor 11 which are connected together as a rigid support for the cage structures including the webs 12 and the rotating knives 13, carried by the shaft 14 which can be driven in any desired manner, as from the ground wheels 15 through the usual gearing (not shown). The body is illustratively to be pushed along the ground as usual by a handle bar connected to the yoke 16. The stationary knife 17 is supported on a sole plate 18 by the cap screws 19; and the sole plate is secured in place beneath the floor 11 by flat head screws 20, with inclusion of a deflector strip 21, formed of sheet metal and serving to prevent cuttings from collecting in the rebate at the front edge of floor 11 and above the ends of screws 19.

The roller R has concentric bearing bushings 25 at its ends to receive the shorter inturned legs 26 of U-shaped support pieces S which are illustrated in the preferred form as being made from metal bars of circular section. The two supports S form a double yoke to support the roller R at both ends and are located in a common essentially horizontal plane. The floor 11 is arched upward to provide a downwardly open trough 27 which receives the roller R. The ends of the trough are partly closed by the webs 28 illustrated as forming integral extensions of the side plates 10. These webs have notches 29 from their lower edges to receive the shorter legs 26 of the supports S, and also have smaller notches 30 which closely receive and permit pivotal movement of the longer legs 31 of the supports S. These longer legs 31 extend toward one another (Figure 3) and are received in notches 32 provided in the lugs 33 which extend from the floor 11 into the trough 27 (Figures 2 and 3). The inward terminals 34 of the supports S are turned to an angle from the axis of the run of the longer legs 31, and engage the lugs 33 to prevent outward disengaging movement of the supports S.

The notches 30, 32 are transversely alined and are closed to prevent disengaging movement of the supports S, this being accomplished in the illustrated form by the presence of the rear part of the sole plate 18 beneath them.

Adjustable links 35 of channel form are provided at each end of the roller R, and are located essentially upright. Each link has an aperture 36 to receive the shorter leg 26 of the corresponding support S. Each link also has a slot 37 to receive a clamping bolt 38 which (Figure 4) preferably has a non-round portion 39 which keys into the web 28 to prevent turning. A sliding clamp piece 40 also receives the bolt 38, and permits the upward and downward movement of the link 35 when the nut 41 is released. It will be noted that this movement is accompanied by a corresponding movement of the roller R, and that this movement occurs in a circular arc about the axis of the longer legs 31 of the supports S. When the nut 41 is tightened, the link 35 and therewith the corresponding end of the roller R is locked in its adjusted position. For ease of adjustment, it is preferred to provide the link 35 with a scale 42 so that the two ends of the roller R may be adjusted for the same height.

The roller R is permitted a minor endwise movement on the legs 26, to assure freedom from binding, being limited in the illustrated form by engagement of the ends of these legs 26 with the bottom of the bearing pieces 25. Any further tendency toward endwise movement is then transmitted through the supports S, and is absorbed by engagement of the radially turned ends 34 with the lugs 33, without exertion of stress upon the adjustment links 35. Similarly, any upward effort upon the roller R is transmitted to the shorter legs 26, and then is transmitted to the links 35 and thence through the clamping parts to the webs 28 essentially without producing deforming stresses upon the supports S.

The parts are held against accidental dis-assembly, and the operations of adjustment do not permit release of the roller R. When it is desired to remove the roller R, the sole plate 18 is released by removing the screws 19, after removal of the knife 17 if imperforate. The supports S are then free for removal from the notches 30, 32, and dis-assembly can then be completed by pulling the supports S outwardly to release them from the roller R and the links 35.

It is obvious that this illustrative preferred form may be modified in many ways within the scope of the appended claims.

I claim:

1. A roller mounting for a lawnmower including a roller and a frame, comprising in combination an inverted trough-like member and upright webs forming parts of the lawnmower frame, said webs having open notches, two U-shaped supports having spaced legs, a first leg of each support being pivotally mounted in a said notch, the other legs of the supports being engaged in the ends of the roller as journals therefor, links connected to the side members and to said other legs to hold the said roller at a fixed position of rotation relative to the frame, and devices for holding the said first legs in the notches.

2. A mounting as in claim 1, in which lugs extend into the trough and have notches for engaging said other legs, and in which the inner ends of said other legs are bent laterally for engaging said lugs and preventing separation of said supports.

3. A roller mounting for a lawnmower including a roller and a frame having side members, said roller being located between said side members, comprising in combination therewith a floor fixed to the side members and providing a downwardly open trough with upright webs at its ends, a roller, two U-shaped supports located in a common essentially horizontal plane, transversely alined notches in said webs, lugs extending into the trough and having notches alined with said web notches, the first legs of said supports being coaxially mounted in said notches, the other legs of the supports being engaged in the ends of the roller as journals therefor, links pivoted to said other legs and extending upwardly therefrom, and clamping devices for preventing said links from shifting on said side members.

GUNNAR SWAHNBERG.

REFERENCES CITED

The following references are of record in the file of this patent:

UNITED STATES PATENTS

| Number | Name | Date |
|---|---|---|
| 855,835 | Clayton | June 4, 1907 |
| 1,164,332 | Brown | Dec. 14, 1915 |
| 1,870,382 | Raun | Aug. 9, 1932 |
| 2,048,518 | Ray | July 21, 1936 |
| 2,260,801 | Clemson | Oct. 28, 1941 |
| 2,303,055 | Lardi | Nov. 24, 1942 |